C. R. WEISS AND C. B. MORRISH.
AUTOMATIC OILER FOR CHAINS.
APPLICATION FILED DEC. 1, 1920.
1,418,892.
Patented June 6, 1922.
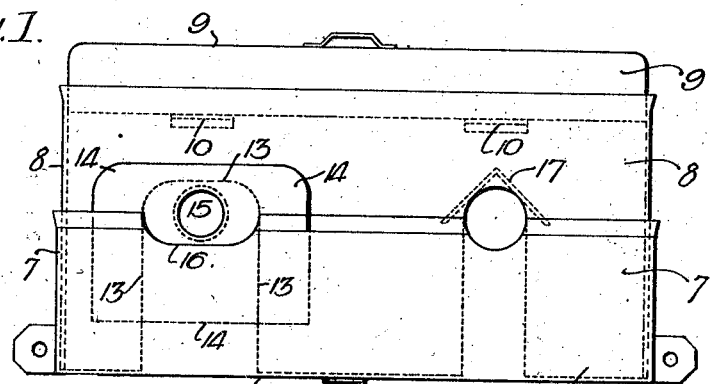
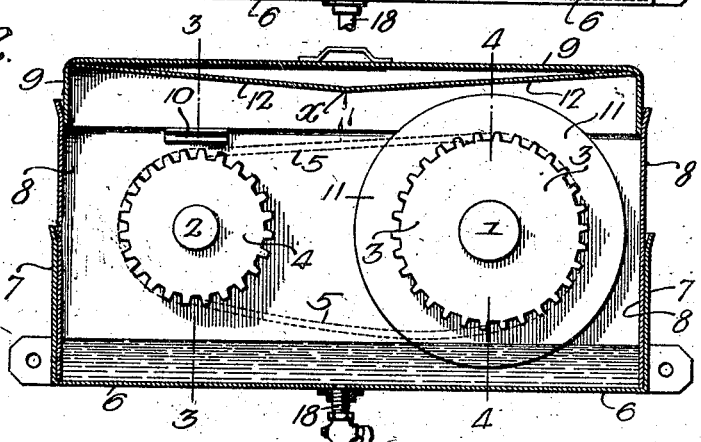
Inventors-
Charles R. Weiss,
Charles B. Morrish.
by their Attorneys
Howson & Howson

UNITED STATES PATENT OFFICE.

CHARLES R. WEISS, OF INDIANAPOLIS, INDIANA, AND CHARLES B. MORRISH, OF PHILADELPHIA, PENNSYLVANIA, ASSIGNORS TO LINK-BELT COMPANY, OF CHICAGO, ILLINOIS, A CORPORATION OF ILLINOIS.

AUTOMATIC OILER FOR CHAINS.

1,418,892.  Specification of Letters Patent.  Patented June 6, 1922.

Application filed December 1, 1920. Serial No. 427,462.

*To all whom it may concern:*

Be it known that we, CHARLES R. WEISS and CHARLES B. MORRISH, citizens of the United States, residing in Indianapolis, Indiana, and Philadelphia, Pennsylvania, have invented certain Improvements in an Automatic Oiler for Chains, of which the following is a specification.

One object of our invention is to provide a simple and effective device for oiling drive chains.

A further object of the invention is to provide means whereby the oil can be thrown against an overhead drip plate from which it will drip onto a chain.

These objects we attain in the following manner, reference being had to the accompanying drawings, in which:—

Fig. 1 is a side view of our improved oiling device for drive chains;

Fig. 2 is a longitudinal sectional view;

Fig. 3 is a transverse sectional view on the line 3—3, Fig. 2;

Fig. 4 is a transverse sectional view on the line 4—4, Fig. 2; and

Fig. 5 is a view of a modification.

Referring to the drawings, 1 is the driven shaft and 2 is the driving shaft. Mounted on the driven shaft is a sprocket wheel 3 and mounted on the driving shaft is a sprocket wheel 4. 5 indicates a drive chain by which the shaft 1 is driven from the shaft 2. The two sprocket wheels are located within a casing consisting of a base section 6 having a comparatively deep flange 7 and an intermediate section 8, which is located withing the base section, as shown. Mounted on the intermediate section is a cover section 9, which rests on lugs 10 secured to, or formed on, the intermediate section. In the present instance the lugs are made of angle metal and are welded to the intermediate section. Secured to the shaft 1, or to the sprocket wheel 3, is a disk 11, which is of greater diameter than the sprocket wheel 3 so that the lower edge of the disk will extend into the oil in the bottom of the casing, as shown in Fig. 2. Mounted on the under side of the cover section 9 is a drip plate 12, which is pressed into such a shape that the oil, that is splashed up against the drip plate by the disk 11, will travel to the center of the casing and preferably to the longitudinal center line of the chain so that the oil will drip onto the chain at this point. In the present instance, the cover plate is slightly beveled from side to side and from end to end so that the lowest part of the plate is at the point *x*.

In ordinary practice, the shafts 1 and 2 may extend through openings in the side of the box, but where it is necessary to adjust a shaft, such as the shaft 2, to take up for wear, a slot 13 is formed in the intermediate section and a recess 16 is formed in the base section. A sealing plate 14 is provided, which has a hole 15 therein of substantially the same diameter as the shaft 2 so as to receive the shaft. This plate is duplicated on the opposite side, if the shaft extends through the casing, but, if the shaft merely projects into the casing, as in Fig. 3, then a separate plate 14$^a$ is placed between the intermediate section and the base to close the opening.

In order to prevent oil dripping onto the shaft 1 at the openings, a deflector 17 is provided, which is secured to each side of the intermediate section directly above the shaft, as shown in Figs. 1 and 4.

18 is a drip pipe for removing the oil from the bottom of the casing, when necessary.

Fig. 5 illustrates a modification, in which the drip plate 12$^a$ is formed as an integral part of the cover plate 9$^a$, the top of the cover being pressed to form the drip plate.

The operation of our improved oiling device is as follows:

The casing encloses the two sprocket wheels and the chain and there is a certain depth of oil in the bottom of the casing. The disk, as it rotates, takes up a certain amount of oil from the bottom of the casing, which is splashed onto the under side of the drip plate, the drip plate being shaped, as hereinbefore described, the oil travels down the drip plate to the lowest point, which is directly above the chain. When a sufficient amount of oil accumulates at this point, it drops from the drip plate onto the chain, lubricating the chain. As this operation is repeated, the chain becomes thoroughly lubricated and any surplus oil will drip from the chain onto the bottom of the casing.

It will be noticed that, by this arrangement, the lower run of the chain preferably travels above the level of the oil in the bottom of the casing.

We claim:

1. The combination in means for lubricating a drive chain, of a casing; two sprocket wheels; a drive chain located in the casing, said casing having an oil chamber below the drive chain and sprocket wheels; a disk mounted adjacent to one of the wheels and arranged to turn therewith, the disk extending into the oil in said chamber; and a drip plate in the upper portion of the casing depressed at a point above the chain so that oil, splashed onto the drip plate by the disk, will travel to the lowest point and will drip from the plate onto the chain.

2. The combination of a casing; two shafts extending through a wall of the casing; a sprocket wheel on each shaft; a drive chain extending from one sprocket wheel to the other, the casing being of such depth as to form an oil chamber in the bottom thereof, the oil in the chamber being normally below the chain; a disk on one of said shafts, said disk being of such diameter as to extend into the oil; a cover for the casing; and a drip plate under the cover depressed at the center above the chain so that oil, carried by the disk, will be splashed onto the drip plate and will travel to the lowest point and will drip onto the chain.

CHARLES R. WEISS.
CHARLES B. MORRISH.